(12) United States Patent
Kim et al.

(10) Patent No.: US 12,449,690 B2
(45) Date of Patent: *Oct. 21, 2025

(54) POLYMER DISPERSED LIQUID CRYSTAL DISPLAY WITH THE IMPROVED AFTERIMAGE

(71) Applicant: LIVICON. CO., LTD, Chungcheongbuk-do (KR)

(72) Inventors: Bong Hee Kim, Chungcheongbuk-do (KR); Seunggi Kim, Chungcheongbuk-do (KR); Hyo Jeong Do, Chungcheongbuk-do (KR); Kyeong-Jin Kim, Chungcheongbuk-do (KR)

(73) Assignee: LIVICON. CO., LTD, Chungcheongbuk-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,473

(22) Filed: Jul. 10, 2024

(65) Prior Publication Data
US 2025/0053041 A1  Feb. 13, 2025

(30) Foreign Application Priority Data

Aug. 10, 2023 (KR) .................. 10-2023-0104611

(51) Int. Cl.
*G02F 1/1333* (2006.01)
*C09K 19/30* (2006.01)
*C09K 19/54* (2006.01)
*G02F 1/1334* (2006.01)
*G02F 1/1343* (2006.01)

(52) U.S. Cl.
CPC ........ *G02F 1/1334* (2013.01); *C09K 19/3003* (2013.01); *C09K 19/544* (2013.01); *G02F 1/134309* (2013.01); *G02F 1/13439* (2013.01); *C09K 2019/3019* (2013.01)

(58) Field of Classification Search
CPC ...... G02F 1/1333; G02F 1/1334; G02F 1/139; C09K 19/38; C09K 19/544; C09K 2019/0444; C09K 2019/0448

See application file for complete search history.

(56) References Cited

U.S. PATENT DOCUMENTS

| 9,146,415 B2 * | 9/2015 | Baek ..................... C09K 19/544 |
| 2020/0183203 A1 | 6/2020 | Tanabe et al. |
| 2025/0053040 A1 * | 2/2025 | Kim .................... C09K 19/544 |
| 2025/0053041 A1 * | 2/2025 | Kim .................... G02F 1/1334 |

FOREIGN PATENT DOCUMENTS

| CN | 111040775 A * | 4/2020 | ............. C09K 19/44 |
| CN | 116165819 A | 5/2023 | |
| DE | 202013006516 U1 | 11/2013 | |
| JP | 08-201780 A * | 8/1996 | ........... G02F 1/1333 |
| JP | 2016-027008 A | 2/2016 | |
| KR | 960040278 A | 12/1996 | |
| KR | 10-2019-0013786 A | 2/2019 | |
| KR | 10-2047783 B1 | 11/2019 | |
| KR | 102500809 B1 * | 2/2023 | ......... G02F 1/13374 |
| WO | WO-2018153803 A1 * | 8/2018 | ............. C09K 19/54 |
| WO | 2020229434 A1 | 11/2020 | |

OTHER PUBLICATIONS

Hu et al., "Colored PDLC Films with Wide Gamut Range", Aug. 5, 2023, Crystals, vol. 13, Issue 8, p. 1216 (Year: 2023).*
Machine translation of CN-111040775-A (Year: 2020).*
Machine translation of JP 08-201780-A (Year: 1996).*
Machine translation of KR 102500809 B1 (Year: 2023).*
Extended European Search Report from corresponding EP Application No. 24193417.3, dated Jan. 2, 2025.

* cited by examiner

*Primary Examiner* — Geraldina Visconti

(74) *Attorney, Agent, or Firm* — Harness, Dickey & Pierce, P.L.C.

(57) ABSTRACT

One embodiment of the present application provide a polymer dispersed liquid crystal display including a first electrode; a second electrode on the first electrode; and a PDLC layer disposed between the first electrode and the second electrode; wherein the PDLC layer includes a liquid crystal droplet and a polymer surrounding the liquid crystal droplet, the liquid crystal droplet has a size in the range of 0.8 to 1.5 µm, the PDLC layer has a thickness in the range of 15 to 25 µm, and wherein the polymer dispersed liquid crystal display has multiple domains driven individually.

9 Claims, 6 Drawing Sheets

POLYMER DISPERSED LIQUID CRYSTAL DISPLAY WITH THE IMPROVED AFTERIMAGE

CROSS-REFERENCE TO RELATED APPLICATIONS

This application claims the benefit of priority of the Korean Patent Application No. 10-2023-0104611 filed on Aug. 10, 2023, which is hereby incorporated by reference as if fully set forth herein.

FIELD

This present application is about a type of smart window called Polymer Disposed Liquid Crystal Display (PDLCD), and more specifically, about a Polymer Disposed Liquid Crystal Display (PDLCD) with an improved afterimage caused by a haze difference.

BACKGROUND

This present application is about a type of smart window called Polymer Disposed Liquid Crystal Display (PDLCD), and more specifically, about a Polymer Disposed Liquid Crystal Display (PDLCD) with an improved afterimage caused by a haze difference.

Polymer dispersed liquid crystal (PDLC) displays have advantages of being simple to manufacture and low power consumption. PDLC displays are currently one of the most widely used smart windows.

In general, a polymer dispersed liquid crystal display (PDLCD) has a liquid crystal dispersed in the polymer system, in the absence of an initial potential difference, the scattered state in which incident light is scattered can be controlled and by applying a potential difference to the film and aligning the liquid crystal molecules in the same direction as the light direction, the transparent state in which incident light passes without scattering can be controlled.

Meanwhile, a polymer dispersed liquid crystal display (PDLCD) may individually drive a plurality of domains. However, when one of the individually driven domains is changed to the scattering mode, the liquid crystal arrangement state is different from that of the other adjacent domains, causing a problem of generation of afterimage due to haze differences between domains, and afterwards, if there is no haze difference between domains, the afterimage disappears.

Therefore, research is continuously being conducted to improve the afterimage between domains in polymer dispersed liquid crystal displays (PDLCDs).

SUMMARY

An embodiment of the present invention is to provide a polymer dispersed liquid crystal display with an improved afterimage.

An embodiment of the present invention is to provide a smart window manufactured using a polymer dispersed liquid crystal display.

In addition to the objects of the present disclosure as mentioned above, additional objects and features of the present disclosure will be clearly understood by those skilled in the art from the following description of the present disclosure.

An embodiment of the present invention to achieve the above technical problem provide a polymer dispersed liquid crystal display including a first electrode, a second electrode on the first electrode, and a PDLC layer placed between the first electrode and the second electrode, wherein the PDLC layer includes a liquid crystal droplet and a polymer surrounding the liquid crystal droplet, and the liquid crystal droplet has a size in the range of 0.8 to 1.5 μm, and the PDLC layer has a thickness in the range of 15 to 25 μm and has multiple domains driven individually.

The polymer may be formed through a polymer precursor containing a first compound represented by Chemical Formula 1.

The first compound can be 5 to 50% by weight based on the total content of the polymer precursor.

The liquid crystal droplet may include a second compound represented by Chemical Formula 2.

The second compound can be 3 to 20% by weight based on the total content of the liquid crystal droplet.

The liquid crystal droplet may include a third compound represented by Chemical Formula 3.

The third compound may have a concentration in the range of 50 to 1000 ppm.

The first electrode and the second electrode may include a transparent conductive material.

The transparent conductive material may include at least one of indium tin oxide (ITO) and indium zinc oxide (IZO).

Another embodiment of the present invention provides a smart window manufactured using the polymer dispersed liquid crystal display.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
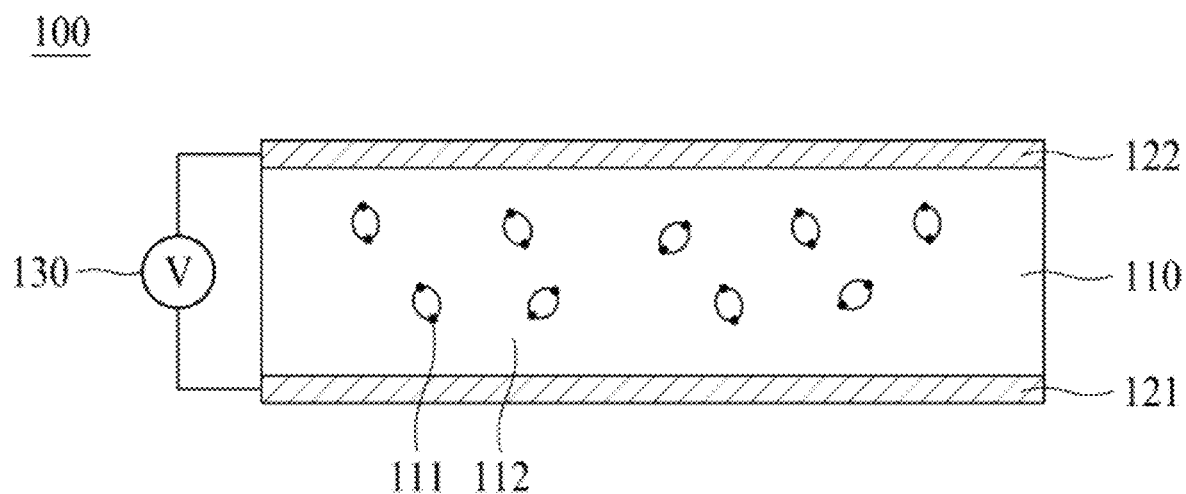
FIG. 1 is a cross-sectional view of a polymer dispersed liquid crystal display according to an embodiment of the present invention.

Advantages and features of the present disclosure and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art. Further, the present disclosure is only defined by scopes of claims.

A shape, a size, a ratio, an angle and a number disclosed in the drawings for describing embodiments of the present disclosure are merely an example and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have' and 'include' described in the present disclosure are used, another portion may be added unless 'only~' is used. The terms of a singular form may include plural forms unless referred to the contrary.

In construing an element, the element is construed as including an error band although there is no explicit description.

In describing a position relationship, for example, when the position relationship is described as 'upon~', 'above~', 'below~' and 'next to~', one or more portions may be disposed between two other portions unless 'just' or 'direct' is used.

Spatially relative terms such as "below", "beneath", "lower", "above", and "upper" may be used herein to easily describe a relationship of one element or elements to another element or elements as illustrated in the drawings. It will be understood that these terms are intended to encompass different orientations of the device in addition to the orientation depicted in the drawings. For example, if the device illustrated in the figure is reversed, the device described to be arranged "below", or "beneath" another device may be arranged "above" another device. Therefore, an exemplary term "below or beneath" may include "below or beneath" and "above" orientations. Likewise, an exemplary term "above" or "on" may include "above" and "below or beneath" orientations.

In describing a temporal relationship, for example, when the temporal order is described as "after," "subsequent," "next," and "before," a case which is not continuous may be included, unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in a co-dependent relationship.

In the addition of reference numerals to the components of each drawing describing embodiments of the present disclosure, the same components can have the same sign as can be displayed on the other drawings.

FIG. 1 is a cross-sectional view of a polymer dispersed liquid crystal display 100 according to an embodiment of the present invention.

Referring to FIG. 1, a polymer dispersed liquid crystal display 100 may include a first electrode 121 and a second electrode 122.

Both the first electrode 121 and the second electrode 122 may include a transparent conductive material. For example, both the first electrode 121 and the second electrode 122 may include at least one of an indium tin oxide (ITO) and an indium zinc oxide (IZO). Preferably, the first electrode 121 and the second electrode 122 may be an indium tin oxide (ITO).

Referring to FIG. 1, the polymer dispersed liquid crystal display 100 may include a PDLC layer 110. Specifically, the PDLC layer 110 may be disposed between the first electrode 121 and the second electrode 122.

Although not shown in the drawings, the polymer dispersed liquid crystal display 100 may include a first substrate and a second substrate. Specifically, both the first substrate and the second substrate may include a transparent material. For example, the first substrate and the second substrate may include at least one of a single glass layer and a transparent plastic film.

According to an embodiment of the present invention, the PDLC layer 110 may include a liquid crystal droplet 111 and a polymer 112. Specifically, a plurality of liquid crystal droplet 111 may be distributed in the PDLC layer 110. Specifically, the PDLC layer 111 includes a liquid crystal droplet 111 and a polymer 112, and the polymer 112 surrounds the liquid crystal droplet 111.

The liquid crystal droplet 111 is phase-separated from the polymer 112. Specifically, when the polymer liquid crystal mixture 113 is cured, the PDLC layer 110 may be formed, and dispersibility of the liquid crystal droplet 111 and the polymer 112 in the PDLC layer 110 may increase. In this process, the polymer 112 may be distinguished from the liquid crystal droplet 111 in a phase-separated manner.

According to an embodiment of the present invention, the PDLC layer 110 may have a thickness in the range of 15 μm to 25 μm. Specifically, in order to scatter the liquid crystal droplets 111 and to stabilize the manufacturing process of the polymer dispersed liquid crystal display 100, the PDLC layer 110 preferably has a thickness in the range of 15 μm to 25 μm.

Figure 2:
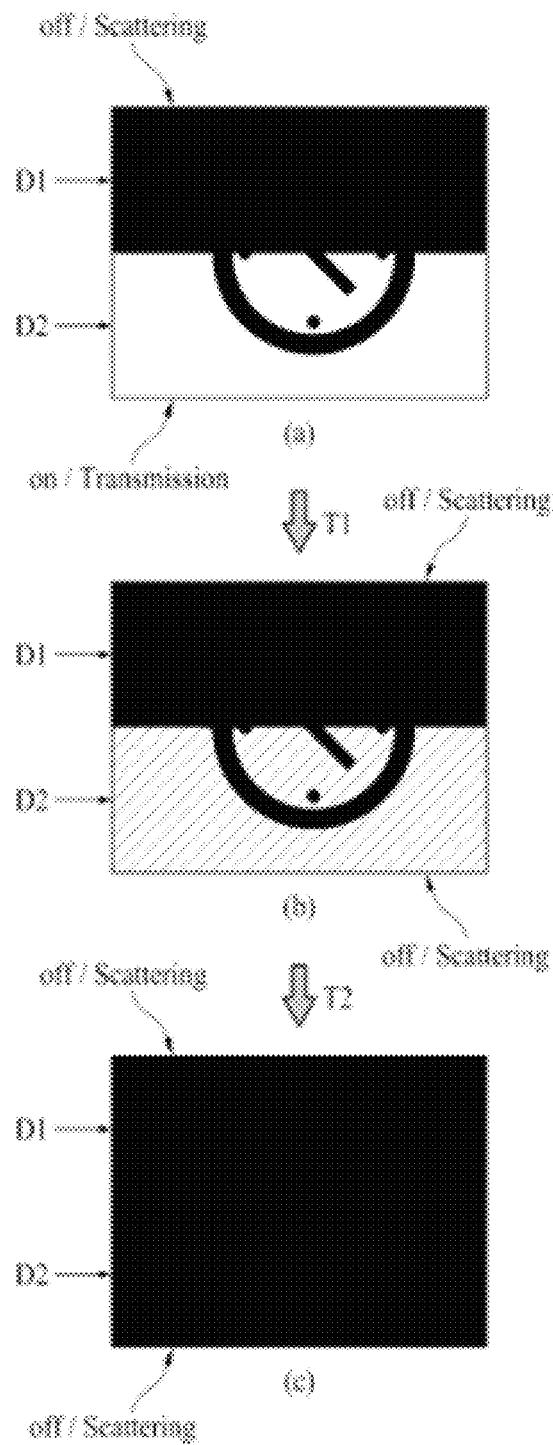
FIG. 2 is a view showing an afterimage in a polymer dispersed liquid crystal display according to an embodiment of the present invention.

FIG. 2 is a view showing an afterimage in a polymer dispersed liquid crystal display according to an embodiment of the present invention.

Referring to FIG. 2, when the second domain D2 of the polymer dispersed liquid crystal display 100 changes from the transmission mode to the scattering mode, an afterimage may occur due to the haze difference from another adjacent first domain D1. Specifically, the cause of the difference is that the liquid crystal arrangement of the first domain D1 and the second domain D2 is not the same.

Referring to FIG. 2(a), the polymer dispersed liquid crystal display 100 has multiple domains that are individually driven, of which the first domain D1 is in a scattering state and the second domain D2 is in a transmissive state.

Next, referring to FIG. 2(b), when the second domain (D2) is changed from the transmission mode to the scattering mode after a certain period of time (T1), a haze difference between the first domain (D1) and the second domain (D2) occurs, resulting in an afterimage.

Next, referring to FIG. 2(c), after a predetermined time T2 passes, the second domain D2 is completely changed to the scattering mode, such that a haze difference between the first domain D1 and the second domain D2 does not occur, and thus an afterimage does not occur. Therefore, in order to prevent an afterimage due to the haze difference, the time of T2 should be shortened. Specifically, when a specific domain is changed to the scattering mode, the time T2 for the complete scattering mode needs to be shortened.

The numerical definition of the afterimage means the haze difference Δhaze between D1 and D2 5 seconds after changing D2 from on to off in the state of FIG. 2(*a*). If Δhaze is 0.3%, the afterimage is generally not felt, but when it exceeds 0.3%, the afterimage is felt.

Figure 3:
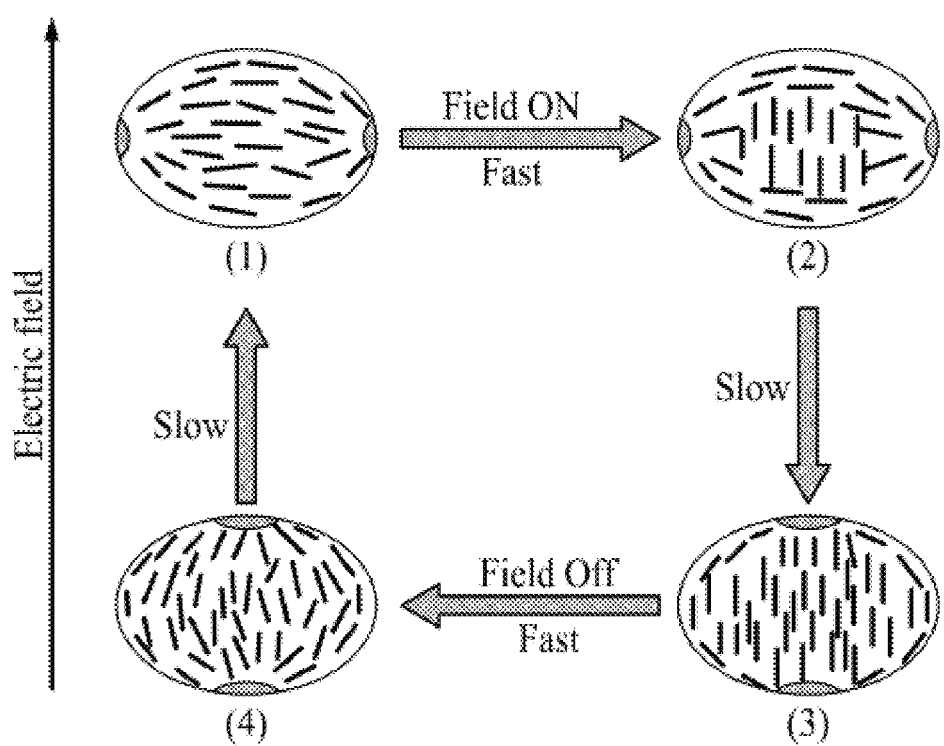
FIG. 3 is a diagram showing a movement of a liquid crystal in a liquid crystal droplet according to an electric field.

FIG. 3 is a diagram showing a movement of a liquid crystal in a liquid crystal droplet according to an electric field.

Specifically, referring to FIG. 3, the change from the (1) state to the (3) state shows a step of changing from the scattering state to the transmission state, and the change from the (3) state to the (1) state means changing from the transmission state to the scattering state. Substantially, the process of changing from the (3) state to the (1) state of FIG. 3 corresponds to the change of the second domain D2 of FIG. 2 from the transmission state to the scattering state. That is, the time of changing from the (4) state to the (1) state of FIG. 3 corresponds to the T2 time of FIG. 2.

According to FIGS. 2 and 3, in order to shorten the time T2 to change from state (4) to state (1), the force or surface energy for attracting the liquid crystal from the surface of the liquid crystal droplet 111 must be large. Specifically, the liquid crystal droplet 111 and the polymer 112 interact as the same organic material. Referring to FIG. 3, when the electric field is removed in the process of progressing from the state (3) to the state (1), it is advantageous from the viewpoint of free energy to arrange the liquid crystal parallel to the surface of the liquid crystal droplet 111. If the size of the liquid crystal droplet 111 is small, the surface area to volume is large and the liquid crystal is more easily arranged parallel to the surface of the liquid crystal droplet 111, so that the state proceeds rapidly from the state (4) of FIG. 3 to the state (1) of FIG. 3.

As described above, according to an embodiment of the present invention, the liquid crystal drop 111 may have a size in the range of 0.8 μm to 1.5 μm. If the size of the liquid crystal drop 111 is in the range of 0.8 μm to 1.5 μm, when the liquid crystal drop 111 changes from the transmission state to the scattering state, it proceeds quickly from the transmission state to the scattering state, so that a haze difference does not occur, thereby preventing an afterimage from occurring. Here, the afterimage does not occur means that the haze difference between domains is within 0.3%. When the haze difference is less than or equal to 0.3%, a person cannot visually feel the haze difference.

On the other hand, when the liquid crystal droplet 111 has a size of less than 0.8 μm, a red wavelength is not scattered in the polymer dispersed liquid crystal display 100. As a result, the polymer dispersed liquid crystal display 100 has a generally red color. In addition, there is a problem that the scattering efficiency is lowered and haze decreases in the scattering state.

Also, when the liquid crystal droplet 111 has a size greater than 1.5 μm, the afterimage is not removed within a short time. According to an embodiment and a comparative example, when it exceeds 1.5 μm, a haze difference within 5 s after changing the PDLC from the on state to the off state is greater than 0.3%. Therefore, in order to prevent the afterimage, the liquid crystal droplet 111 is adjusted in the range of 0.8 to 1.5 μm. More preferably, the liquid crystal droplet may be adjusted in the range of 0.8 to 1.3 μm.

According to an embodiment of the present invention, the liquid crystal droplet 111 in the PDLC layer 110 is controlled by a curing condition in a process. Specifically, the curing condition is that the intensity of ultraviolet rays is 2 to 6 mW/cm2, and the temperature during curing is 25 to 45° C.

As a result, the size of the liquid crystal droplet 111 may be adjusted in the range of 0.8 to 1.5 μm.

According to an embodiment of the present invention, in order to prevent the afterimage of the polymer dispersed liquid crystal display 100, the interface energy of the polymer 112 needs to increase. Specifically, when the energy of the interface increases by increasing the interaction between the liquid crystal and the polymer 112 at the interface between the polymer 112 and the liquid crystal droplet 111, the afterimage may be prevented.

The liquid crystal is substituted with a cyano group (—CN), fluorine (—F), or the like. Such a substituent is composed of atoms having high electronegativity to utilize the characteristics of an induced dipole. If there is a hydroxy group (—OH) at the interface, hydrogen at the interface and fluorine or nitrogen of the liquid crystal may form a hydrogen bond. Therefore, if there is a hydroxy group (—OH) at the interface, energy of the interface increases, and an interaction between the polymer 112 and the liquid crystal increases, thereby preventing an afterimage.

According to an embodiment of the present invention, the polymer 112 may be formed by a polymer precursor including a first compound represented by Chemical Formula 1.

In this case, the polymer precursor may be said to be before the polymer 112 is cured. Specifically, the polymer precursor may include a first compound represented by Chemical Formula 1, and the polymer 112 may be formed by curing.

[Chemical formula 1]

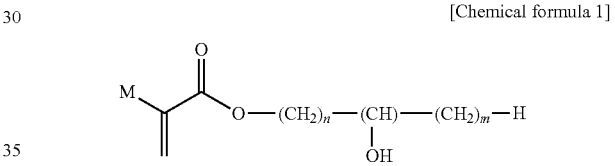

M denotes a methyl group or hydrogen, n and m are 0 to 9, and the sum of n and m is 1 to 10.

According to an embodiment of the present invention, Chemical Formula 1 may be any one group selected from Chemical Formulae 1-1 to 1-13.

[Chemical formula 1-1]

[Chemical formula 1-2]

[Chemical formula 1-3]

[Chemical formula 1-4]

-continued

[Chemical formula 1-5]
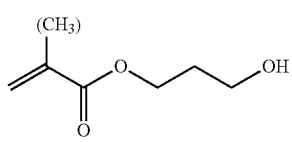

[Chemical formula 1-6]
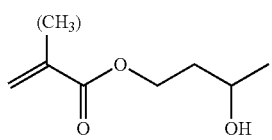

[Chemical formula 1-7]
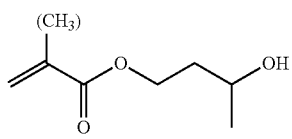

[Chemical formula 1-8]
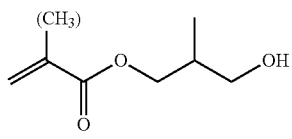

[Chemical formula 1-9]
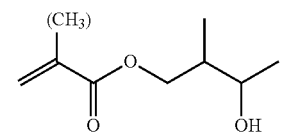

[Chemical formula 1-10]
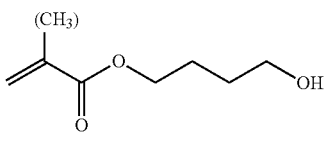

[Chemical formula 1-11]
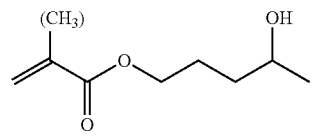

[Chemical formula 1-12]
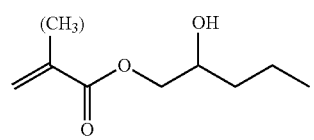

[Chemical formula 1-13]
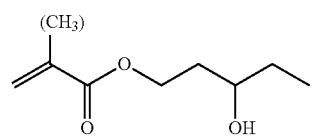

According to an embodiment of the present invention, the first compound represented by Chemical Formula 1 may be 5 to 50% by weight based on the total content of the polymer precursor. In order to prevent the afterimage by increasing the energy of the interface, the first compound needs to be 5 to 50% by weight based on the total content of the polymer precursor.

On the other hand, when the first compound is less than 5 wt % with respect to the total content of the polymer precursor, the afterimage reduction effect due to the first compound does not occur.

In addition, when the first compound exceeds 50% by weight of the total content of the polymer precursor, it may be difficult to control other physical properties of the polymer.

According to an embodiment of the present invention, the liquid crystal droplet 111 may include a second compound represented by Chemical Formula 2.

[Chemical formula 2]
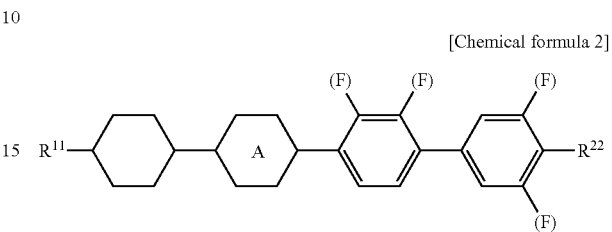

In Chemical Formula 2, R11 refers to at least one of a C2-C10 alkyl group, an ethylene group, and an alkoxy group, ring A refers to a phenyl group or a cyclohexyl group, (F) refers to fluorine or hydrogen, and R22 refers to a C2-C10 alkyl group, fluorine, or a cyano group.

According to an embodiment of the present invention, Chemical Formula 2 may be any one group selected from Chemical Formulae 2-1 to 2-11.

[Chemical formula 2-1]
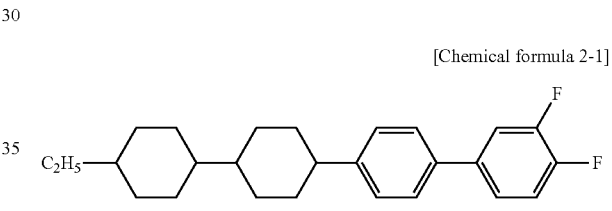

[Chemical formula 2-2]

[Chemical formula 2-3]
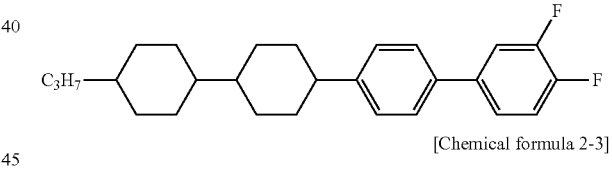

[Chemical formula 2-4]
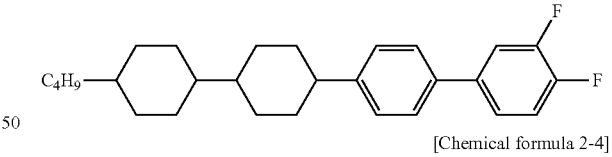

[Chemical formula 2-5]
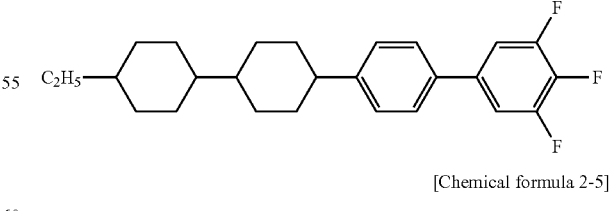

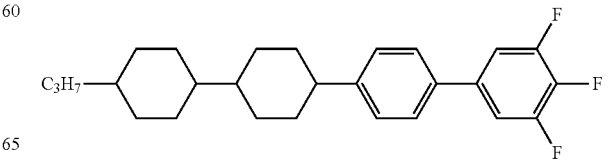

-continued

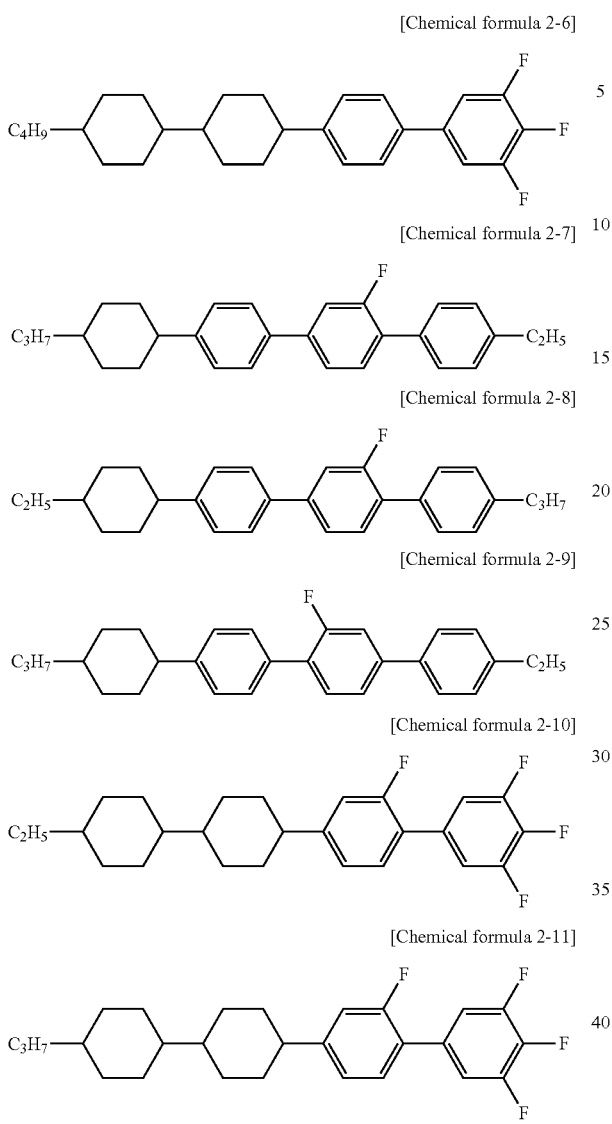

[Chemical formula 2-6]

[Chemical formula 2-7]

[Chemical formula 2-8]

[Chemical formula 2-9]

[Chemical formula 2-10]

[Chemical formula 2-11]

The second compound is an essential material in order to maintain the transparent point of the liquid crystal droplet 111 at 100° C. or higher.

According to an embodiment of the present invention, the second compound represented by Chemical Formula 2 may be 3 to 20 wt %. Specifically, the wt % means 3 to 20 wt % based on the total content of the liquid crystal droplet 111. In order for the liquid crystal droplet 111 to maintain a transparent point of 100° C. or more, the second compound needs to be maintained at 3 to 20 wt %.

On the other hand, when the second compound is less than 3 wt %, it may be difficult to maintain the transparent point of the liquid crystal droplet 111 at 90° C. or higher.

In addition, when the second compound exceeds 20% by weight, the possibility of crystallization at low temperatures increases, causing a problem of precipitation of crystals.

According to an embodiment of the present invention, the liquid crystal droplet 111 may further include a third compound represented by Chemical Formula 3.

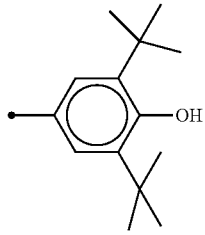

[Chemical formula 3]

The third compound represented by Chemical Formula 3 serves to prevent a chain reaction during a radical reaction by heat in the PDLC layer 110.

According to an embodiment of the present invention, the third compound may have a concentration in the range of 50 to 1000 ppm. In order to secure the thermal stability of the PDLC layer 110, the third compound needs to be maintained at a concentration in the range of 50 to 1000 ppm.

On the other hand, when the concentration of the third compound is less than 50 ppm, there is a problem that the effect of preventing the radical reaction by heat in the PDLC layer 110 decreases, and as a result, the thermal stability in the PDLC layer 110 decreases.

In addition, when the concentration of the third compound exceeds 1000 ppm, the transparent point of the liquid crystal droplet (111) decreases, resulting in a problem of deteriorating the electro-optical characteristics of the polymer dispersed liquid crystal display (100).

According to an embodiment of the present invention, the polymer dispersed liquid crystal display 100 may be provided with a power source 130 capable of applying a driving voltage to the first electrode 121 and the second electrode 122.

Figure 4A:
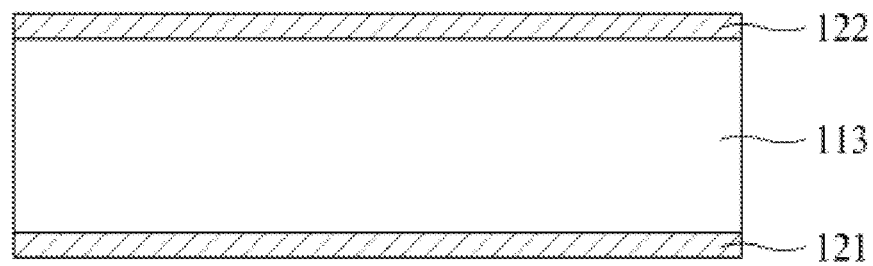
FIGS. 4A, 4B, and 4C are diagrams showing a manufacturing process of a polymer dispersed liquid crystal display.
Figure 4B:
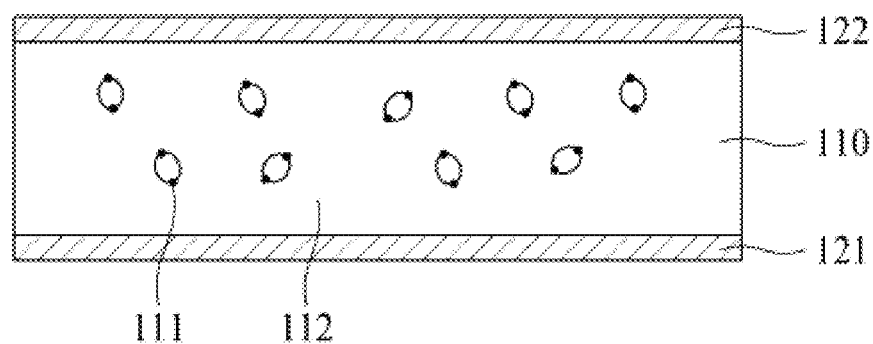
Figure 4C:
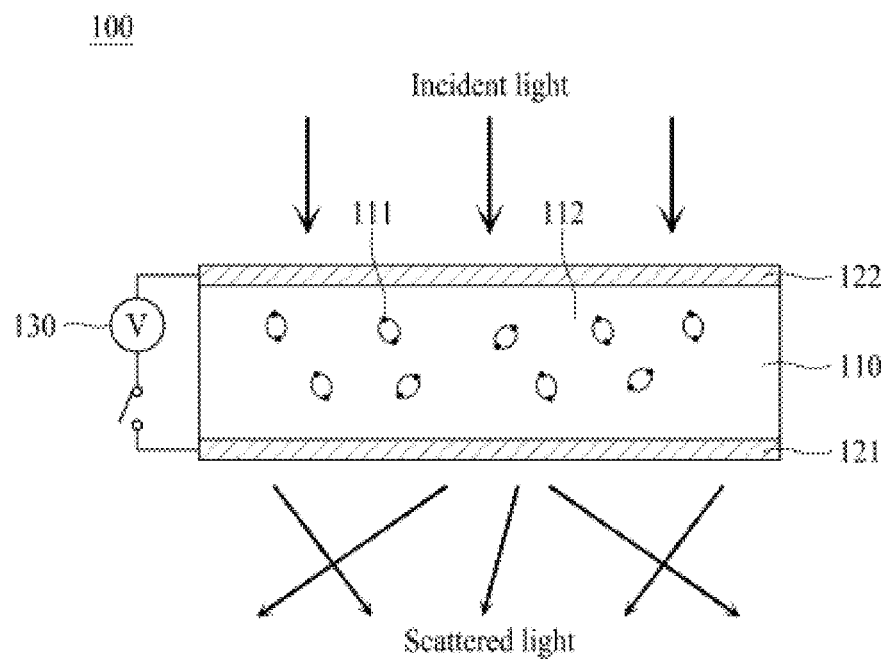
Figure 4C:
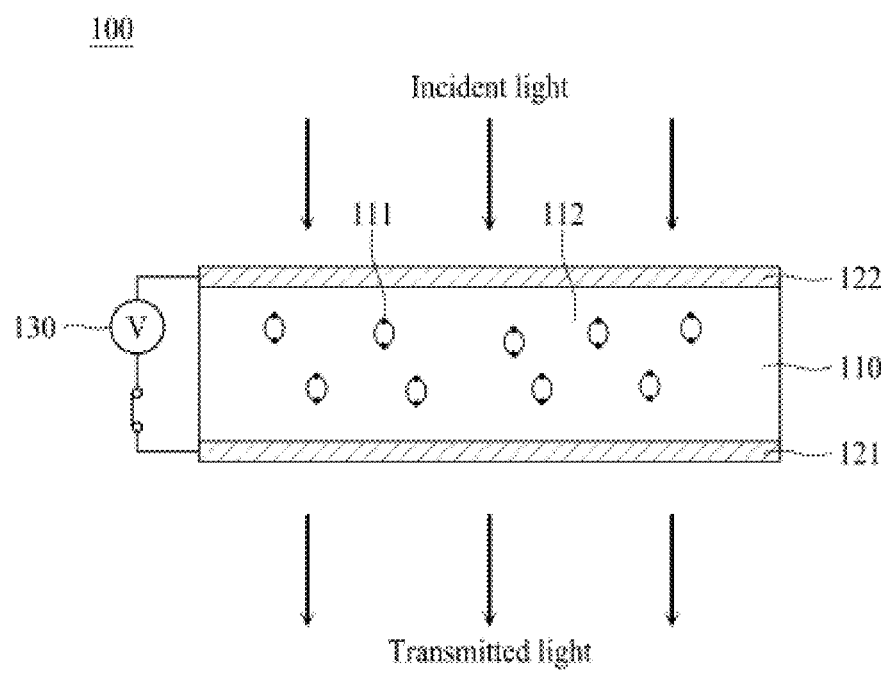

Referring to FIG. 4C, the electric field may not be generated between the first electrode 121 and the second electrode 122 in a state in which the driving voltage is not applied to the first electrode 121 and the second electrode 122, that is, an open circuit state. In this case, the liquid crystal droplet 111 is disposed without a certain directionality, and the incident light is scattered to cause an opaque scattering state.

Also, referring to FIG. 4C, the first electrode 121, the second electrode 122, and the power source 130 may be electrically connected to each other, such that an electric field may be generated between the first electrode 121 and the second electrode 122 in a closed circuit state. The direction of the electric field may be perpendicular to the first electrode 121 and the second electrode 122. The liquid crystal droplets 111 may be aligned in a direction parallel to the electric field. That is, the major axis of the liquid crystal droplet 111 is disposed parallel to the direction of the electric field, and incident light passes without scattering to become a transparent transmission state.

FIGS. 4A to 4C are diagrams showing a manufacturing process of the polymer dispersed liquid crystal display 100.

Specifically, referring to FIG. 4A, in the manufacturing process of the polymer dispersed liquid crystal display 100, a polymer dispersed liquid crystal mixture 113 was applied to one surface of the first electrode 121 and then the second electrode 122 was combined thereon using a roller to produce the polymer dispersed liquid crystal cell 101.

Then, referring to FIG. 4B, the first electrode 121 including the polymer liquid crystal mixture 113 was irradiated with ultraviolet rays (UV) to cure the polymer liquid crystal mixture 113 to manufacture the polymer dispersed liquid crystal display 100.

Next, referring to FIG. 4C, a power source 130 connecting the first electrode 121 and the second electrode 122 may be installed.

In this case, the electric field may not be generated between the first electrode 121 and the second electrode 122 in a state in which a driving voltage is not applied to the first electrode 121 and the second electrode 122, that is, an open circuit state. In this case, the liquid crystal droplet 111 may be disposed without a certain direction.

Also, the first electrode 121, the second electrode 122, and the power source 130 may be electrically connected to each other, such that an electric field may be generated between the first electrode 121 and the second electrode 122 in a closed circuit state. The direction of the electric field may be perpendicular to the first electrode 121 and the second electrode 122. The liquid crystal droplets 111 may be aligned in a direction parallel to the electric field. That is, the major axis of the liquid crystal droplet 111 may be parallel to the direction of the electric field.

Figure 5:
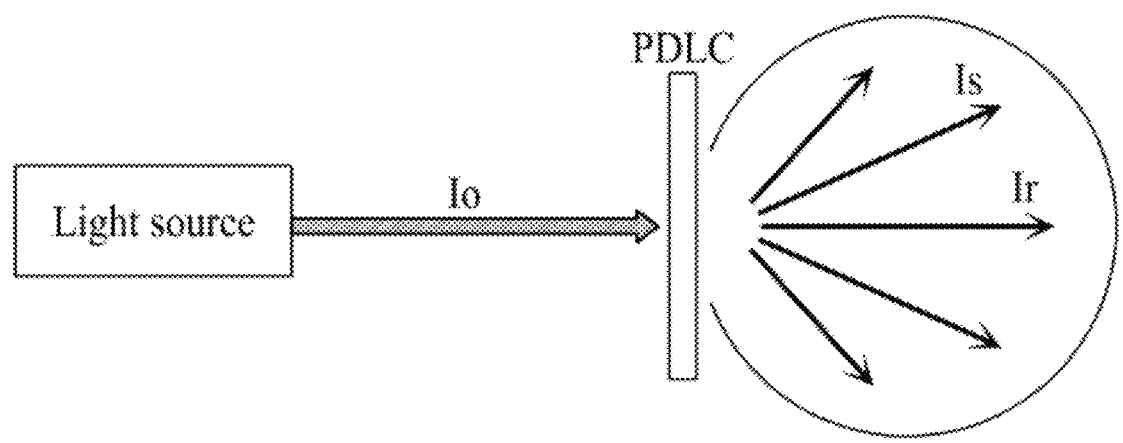
FIG. 5 is a schematic diagram showing a haze measurement method.

FIG. 5 is a schematic diagram showing a haze measurement method.

Specifically, FIG. 5 is a schematic diagram showing a haze measurement method for a polymer dispersed liquid crystal (PDLC). Here, the polymer dispersed liquid crystal (PDLC) may correspond to the PDLC layer 110 of the present invention.

Referring to FIG. 5, light incident on the polymer dispersion liquid crystal (PDLC) is defined as I0, the light through which the incident light (I0) is transmitted head-on in an error range of ±2.5° is defined as Ir, and when Is is the light excluding the light (Ir) transmitted head-on among the transmitted light, haze is defined as Is/(Ir+Is).

Hereinafter, the present invention will be described in detail with reference to embodiments and comparative examples. However, the following embodiments are only for helping the understanding of the present invention, and the scope of the present invention is not limited to these embodiments.

Embodiments 1-4 and Comparative Examples 1-3

In order to improve the present invention, a polymer dispersed liquid crystal display was prepared using various polymer/liquid crystal mixtures. The content of the polymer/liquid crystal mixture is shown in Table 1 below.

Example 1

The polymer precursor was performed in the content shown in Table 1, and the ratio of the first compound was 10%. HKH-015 (Bayi Co.) was used as the liquid crystal, and there were 3 wt % of (Chemical Formula 2-4) and 4 wt % of (Chemical Formula 2-5) as the second compound, and 0.03 wt % of the antioxidant (4-sec-butyl-2,6-di-tert-butylphenol; TIC Co.) was added as the third compound. The polymer precursor and the liquid crystal were mixed at a ratio of 50:50 and the initiator was mixed in an amount of 1 wt % to prepare a "polymer/liquid crystal mixture."

The first electrode and the second electrode were used by sputtering ITO on an A4165 PET film manufactured by Toyobos Corporation, and one in which the ITO electrode layer was removed to have a width of 60 μm using a laser trimmer was used as a pixel electrode ITO-PET. After coating the pixel electrode ITO-PET with a slot die, the polymer/liquid crystal mixture was laminated with the common electrode ITO-PET, and the amount of integrated light was 1J using a 3 mW/cm2 ultraviolet lamp having a wavelength of 365 nm. After preparation, a PDLC layer of 17 μm was prepared, and the size of liquid crystal droplets is shown in Table 1 below.

Examples 2-4, Comparative Examples 1-3

Polymer precursors were prepared according to the contents of Table 1. HGKH-015 liquid crystals were used except for Comparative Example 1, and the second compound contained 7%. As for the third compound, 0.03 wt % for Examples 2 to 4 and 0.03 wt % for Comparative Examples 1 to 3 were not added as shown in Table 1. The liquid crystals of Comparative Example 1 were E7 (Merck Co., Ltd.) and were devoid of the second compound and the third compound.

In addition, the process of making the PDLC film was the same as that of Example 1, and the results are summarized in Table 1.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Composition ratio of polymer precursors (% by weight) | NOA65 | 50 | 46 | 47 | 47 | 51 | 51 | 51 |
|  | 2-EHA | 20 | 20 | 20 | 20 | 45 | 45 | 40 |
|  | 2-EHMA | 0 | 0 | 0 | 0 | 0 | 0 | 5 |
|  | HDDA | 20 | 4 | 3 | 3 | 4 | 4 | 4 |
|  | first compound HEM | 10 | 15 | 20 | 20 | 0 | 0 | 0 |
|  | 4-HBA | 0 | 15 | 10 | 10 | 0 | 0 | 0 |
| Liquid crystal droplet composition ratio (% by weight) | Liquid crystal type | HGKH-015 | HGKH-015 | HGKH-015 | HGKH-015 | E7 | HGKH-015 | HGKH-015 |
|  | second compound | 7 | 7 | 7 | 7 | 0 | 7 | 7 |
|  | third compound | 0.03 | 0.03 | 0.03 | 0.03 | 0 | 0 | 0 |
| TPO(% by weight) |  | 1 | 1 | 1 | 1 | 1 | 1 | 1 |
| the size of the liquid crystal droplet (μm) |  | 1.2 | 1.0 | 1.0 | 1.2 | 1.7 | 1.7 | 2.5 |
| Afterimage results | ΔHaze (afterimage) (%) | 0.25 | 0.18 | 0.17 | 0.15 | 0.90 | 0.90 | 1.1 |
| Reliability | ΔHaze | 0.2 | 0.2 | 0.2 | 0.2 | 3.0 | 3.0 | 2.6 |

TABLE 1-continued

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Results | (reliability) (%) |  |  |  |  |  |  |  |
| 90° C. haze | 90° C. OFF Scattering haze (%) | 90 | 89 | 90 | 91 | 20 | 84 | 85 |

NOA65: Norland Optical Adhesive 65 (Edmond Optics Korea)
2-EHA: 2-Ethylhexyl Acrylate (Aldrich)
2-EHMA: 2-Ethylhexyl Methacrylate (Aldrich)
HDDA: 1,6-hexanediol diacrylate (Aldrich)
HEM: 2-Hydroxyethyl methacrylate (Aldrich)
4-HBA: 4-Hydroxybutyl acrylate (Aldrich)
TPO: 2,4,6-trimethylbenzoyl-diphenyl-phosphine oxide (Ciba Special Chemicals)

The polymer dispersed liquid crystal displays of Examples 1-4 and Comparative Examples 1-3 thus prepared were identified as i) Haze (afterimage), ii) Haze (reliability), and iii) 90° C. OFF scattering haze.

i) Haze (Afterimage) Measurement

Referring to FIG. 2, after applying a voltage to 48V for 10 seconds in the second domain D2, the voltage is changed to the Off state, Haze 2 is measured 5 seconds later, and then Haze 1 is measured in the Off state of the first domain D1, and then Haze 1 minus Haze 2 is expressed as an afterimage.

Haze (Reliability)

Referring to FIG. 2, a second domain D2 is applied with a voltage of 48 V, Haze A is measured, and the off-state polymer-dispersed liquid crystal display is placed in a high-temperature chamber at 85° C., heated for 168 hours, and then the polymer-dispersed liquid crystal display is cooled to room temperature, and the second domain D2 is applied with a voltage of 48 V, and Haze B is measured. In this case, a value obtained by subtracting Haze B from Haze A is expressed as Haze (reliability).

iii) 90° C. OFF Scattering Haze

90° C. OFF scattering haze refers to haze measured in a state in which electricity is not applied by heating the polymer dispersed liquid crystal display to 90° C.

iv) Measure Haze

The light incident on the polymer dispersion liquid crystal (PDLC) is defined as I0, the light through which the incident light (I0) is transmitted head-on in an error range of ±2.5° is defined as Ir, and when Is is the light excluding the light (Ir) transmitted head-on among the transmitted light, haze is defined as Is/(Ir+Is).

NDH 700011 from Nippon Denshoku was used as the haze measuring instrument, and ASTM D 1003 was used as the measurement standard.

Referring to Table 1, the following results can be confirmed.

According to Examples 1 to 4, the size of the liquid crystal droplet is 1.5 μm or less, and Δhaze (afterimage) is 0.3% or less, and the afterimage level is very good. In addition, in the polymer, Δhaze (afterimage) of Examples 2 to 4 in which the ratio of the first compound is 30% by weight or less is 0.2% by weight or less, but in Example 1 in which the ratio of the first compound is 10% by weight is higher than that of other examples, Δhaze (afterimage) is 0.25%, which is higher than that of other examples. As a result, the size of the liquid crystal droplet is smaller, and the greater the ratio of the first compound, the lower the afterimage. In contrast, Δhaze (afterimage) is very high at 0.9% or more in Comparative Examples 1 to 3 in which the size of the liquid crystal droplet is 1.5 μm or more, and the first compound is not included.

In addition, an embodiment including the second compound in the liquid crystal has ΔHaze (reliability) within 0.5%, but a comparative example without the second compound has ΔHaze (reliability) of 2.0% or more. As described above, the second compound serves to prevent deterioration of the PDLC layer due to heat.

In addition, in Comparative Example 1 without the third compound, the 90° C. OFF scattering haze (%) was 20% and the shielding capacity was almost lost, but other Examples and Comparative Examples showed very good values of 85% or more.

According to the present disclosure, the following advantageous effects may be obtained.

The polymer dispersed liquid crystal display according to an embodiment of the present invention may improve an afterimage due to a haze difference between domains.

In addition to the above-mentioned effects, other features and advantages of the present invention may be described below, or may be clearly understood by those of ordinary skill in the art to which the present invention belongs from such techniques and descriptions.

In addition to the above-mentioned effects, other features and advantages of the present invention may be described below, or may be clearly understood by those of ordinary skill in the art to which the present invention belongs from such techniques and descriptions.

In addition to the above-mentioned effects, other features and advantages of the present invention will be described below or clearly understood by those of ordinary skill in the art to which the present invention belongs from such technology and

DESCRIPTION

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A polymer dispersed liquid crystal (PDLC) display comprising:
a first electrode;
a second electrode on the first electrode; and
a PDLC layer;
wherein the PDLC layer disposed between the first electrode and the second electrode,
wherein the PDLC layer includes a liquid crystal droplet and a polymer surrounding the liquid crystal droplet, wherein the liquid crystal droplet has a size in a range of 0.8 to 1.5 µm, wherein the PDLC layer has a thickness in a range of 15 to 25 µm, wherein the polymer dispersed liquid crystal display has multiple domains driven individually, and wherein the liquid crystal droplet further includes a third compound represented by 4-sec-butyl-2,6-di-tert-butylphenol.

2. The polymer dispersed liquid crystal display of claim 1, wherein the polymer is formed through a polymer precursor containing a first compound represented by Chemical Formula 1:

Chemical Formula 1

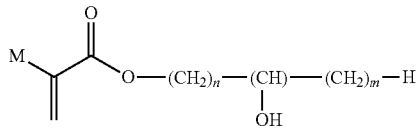

M refers to a methyl group or hydrogen, n and m are 0 to 9, and a sum of n and m is 1 to 10.

3. The polymer dispersed liquid crystal display of claim 2, wherein the first compound is 5 to 50% by weight based on a total content of the polymer precursor.

4. The polymer dispersed liquid crystal display of claim 1, wherein the liquid crystal droplet includes a second compound represented by Chemical Formula 2:

Chemical Formula 2

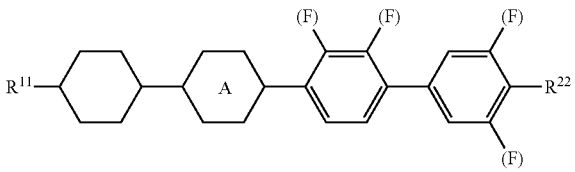

$R^{11}$ refers to a C2-C10 alkyl group, an ethylene group, or an alkoxy group, (F) refers to fluorine or hydrogen, ring A refers to a phenyl group or a cyclohexyl group, and $R^{22}$ refers to a C2-C10 alkyl group, fluorine, or a cyano group.

5. The polymer dispersed liquid crystal display of claim 4, wherein the second compound is 3 to 20% by weight based on a total content of the liquid crystal droplet.

6. The polymer dispersed liquid crystal display of claim 1, wherein the third compound has a concentration in a range of 50 to 1000 ppm.

7. The polymer dispersed liquid crystal display of claim 1, wherein the first electrode and the second electrode include a transparent conductive material.

8. The polymer dispersed liquid crystal display of claim 7, wherein the transparent conductive material includes at least one of indium tin oxide (ITO) and indium zinc oxide (IZO).

9. A smart window comprising the polymer dispersed liquid crystal display of claim 1.

* * * * *